(12) United States Patent
Horiuchi et al.

(10) Patent No.: US 10,848,019 B2
(45) Date of Patent: Nov. 24, 2020

(54) MOTOR

(71) Applicant: SANYO DENKI CO., LTD., Tokyo (JP)

(72) Inventors: Manabu Horiuchi, Tokyo (JP); Mai Shimizu, Tokyo (JP); Jun Kitajima, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 390 days.

(21) Appl. No.: 15/495,337

(22) Filed: Apr. 24, 2017

(65) Prior Publication Data
US 2017/0317537 A1 Nov. 2, 2017

(30) Foreign Application Priority Data

Apr. 28, 2016 (JP) .................. 2016-091057

(51) Int. Cl.
| | |
|---|---|
| H02K 9/22 | (2006.01) |
| H02K 5/15 | (2006.01) |
| H02K 1/16 | (2006.01) |
| H02K 5/08 | (2006.01) |

(52) U.S. Cl.
CPC ............. *H02K 1/165* (2013.01); *H02K 5/08* (2013.01); *H02K 9/22* (2013.01); *H02K 5/15* (2013.01)

(58) Field of Classification Search
CPC .. H02K 5/04; H02K 5/06; H02K 5/08; H02K 9/22; H02K 1/148; H02K 5/00; H02K 5/15
USPC ................ 310/43, 89, 64, 400–433
See application file for complete search history.

(56) References Cited

U.S. PATENT DOCUMENTS

| | | | | |
|---|---|---|---|---|
| 6,369,687 | B1 * | 4/2002 | Akita ................ | H02K 1/148 310/216.011 |
| 6,592,336 | B1 * | 7/2003 | Hirano ............... | F04B 17/03 417/201 |
| 2010/0079014 | A1 * | 4/2010 | Miyashita ........... | H02K 5/08 310/43 |
| 2010/0300779 | A1 * | 12/2010 | Sagara ............... | H02K 5/08 180/65.1 |
| 2013/0026887 | A1 * | 1/2013 | Miyahara ............ | H02K 5/15 310/402 |

(Continued)

FOREIGN PATENT DOCUMENTS

| | | |
|---|---|---|
| JP | 7163082 A2 | 6/1995 |
| JP | 8-322170 A | 12/1996 |

(Continued)

OTHER PUBLICATIONS

JP-2012070506-A (English Translation) (Year: 2012).*

(Continued)

*Primary Examiner* — Quyen P Leung
*Assistant Examiner* — Alexander Moraza
(74) *Attorney, Agent, or Firm* — Rankin, Hill & Clark LLP

(57) ABSTRACT

A motor includes: a stator that includes a teeth iron core and a yoke iron core; a rotor housed in the stator; an output-side flange; a projection disposed at the yoke iron core, the projection projecting on an output side of the motor with respect to an end surface of the teeth iron core; and a concave portion disposed at the output-side flange, the concave portion at which the projection is disposed, the concave portion contacting an inner peripheral surface of the projection.

8 Claims, 10 Drawing Sheets

(56) References Cited

U.S. PATENT DOCUMENTS

2013/0106210 A1* 5/2013 Tsutsui .................. H02K 5/128
                                                              310/52
2018/0175707 A1* 6/2018 Miyama .................. H02K 3/12

FOREIGN PATENT DOCUMENTS

| JP | 11098726 | A2 | | 4/1999 |
|----|----------|----|----|--------|
| JP | 2001-309595 | A | | 11/2001 |
| JP | 2006-87244 | A | | 3/2006 |
| JP | 3780164 | B2 | | 5/2006 |
| JP | 2007104783 | A | * | 4/2007 |
| JP | 2008199711 | A2 | | 8/2008 |
| JP | 2008-278654 | A | | 11/2008 |
| JP | 2012070506 | A | * | 4/2012 |
| JP | 2012070506 | A2 | | 4/2012 |
| JP | 2012-130157 | A | | 7/2012 |

OTHER PUBLICATIONS

JP-2007104783-A (English Translation) (Year: 2007).*
https://www.merriam-webster.com/dictionary/steel (Year: 2019).*
Notice of Reason for Refusal for Japanese Patent Application No. 2016-091057 dated Sep. 13, 2016.
Chinese Office Action(CNOA) dated Feb. 3, 2020, for the corresponding Chinese Patent Application No. 201710220320.1.
Chinese Office Action (CNOA) dated Sep. 2, 2020 for the corresponding Chinese Patent Application No. 201710220320.1.

* cited by examiner

MOTOR

CROSS-REFERENCE TO RELATED APPLICATION

This application claims priority from Japanese Patent Application No. 2016-091057 filed with the Japan Patent Office on Apr. 28, 2016, the entire content of which is hereby incorporated by reference.

BACKGROUND

1. Technical Field

The present disclosure relates to a motor.

2. Description of the Related Art

A motor includes a rotor (rotator), a stator, and an output-side (load-side) flange. There has been examined a structure of a motor that transmits heat from a heat generator (for example, a stator iron core) to an outside via a constituting member such as a flange to emit the heat.

SUMMARY

A motor includes: a stator that includes a teeth iron core and a yoke iron core; a rotor housed in the stator; an output-side flange; a projection disposed at the yoke iron core, the projection projecting on an output side of the motor with respect to an end surface of the teeth iron core; and a concave portion disposed at the output-side flange, the concave portion at which the projection is disposed, the concave portion contacting an inner peripheral surface of the projection.

DESCRIPTION OF THE EMBODIMENTS

Figure 1A:
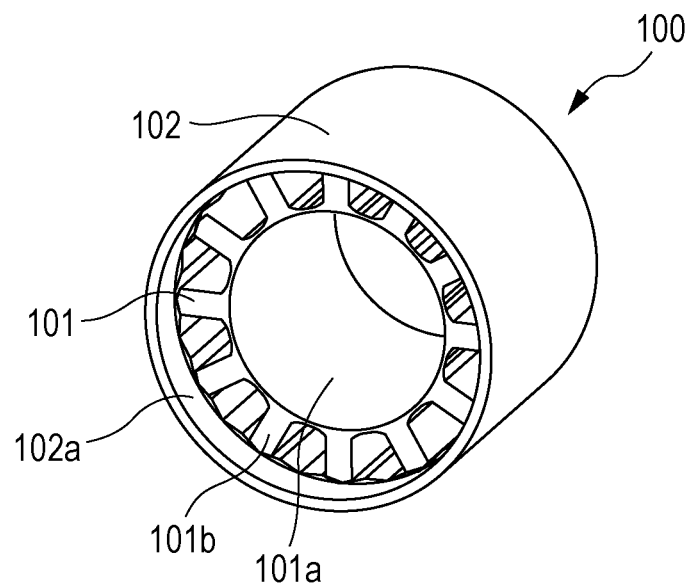
FIGS. 1A to 1C are a first configuration example of a stator according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With a mold motor in Japanese Patent No. 3780164, a plurality of metal bars is buried to an inside of a stator. End portions of these metal bars contact end brackets. Holes for ground pin are preliminarily disposed at a stator iron core. To provide grounding, the metal bars are inserted into these holes. However, this mold motor needs preparation of the plurality of metal bars for heat emission and grounding. This increases the constituting members for the motor. To insert the metal bars, the plurality of holes need to be disposed at this mold motor. This also increases a production cost.

With a mold motor in JP-A-7-163082, a projection on an outer peripheral portion of a bracket is brought into contact with an output-side end surface on an outer peripheral portion of a stator core to emit heat. However, for insulation between layers of electromagnetic steel plate, an insulated film is applied on the stator core made of the electromagnetic steel plate. In view of this, heat is less likely to flow in a laminating direction of the electromagnetic steel plates. Accordingly, the heat is less likely to flow from the output-side end surface of the stator core to the projection of the bracket. This fails to obtain a sufficient heat emission effect.

A mold motor in JP-A-11-98726 brings a load-side flange into contact with an axial end portion of a stator iron core to emit heat. However, even with this stator iron core, the heat is less likely to flow in a laminating direction of electromagnetic steel plates. Accordingly, the heat is less likely to flow from an axial end portion of the stator iron core to a load-side flange. This fails to obtain a sufficient heat emission effect.

One object of the present disclosure is to provide a structure of a motor that allows an improvement in heat emission effect of the motor and conduction of grounding with a simpler configuration.

A motor according to an embodiment of the present disclosure (the present motor) includes: a stator that includes a teeth iron core and a yoke iron core; a rotor housed in the stator; an output-side flange; a projection disposed at the yoke iron core, the projection projecting on an output side of the motor with respect to an end surface of the teeth iron core; and a concave portion disposed at the output-side flange, the concave portion at which the projection is disposed, the concave portion contacting an inner peripheral surface of the projection.

The present motor may further include a heat transmission member disposed between the teeth iron core and the output-side flange. Moreover, in the present motor, the inner peripheral surface of the projection may contact the heat transmission member.

In the present motor, the stator may have an outer peripheral portion covered with a resin, and the projection may have an output-side end surface that contacts the concave portion on the output-side flange.

In the present motor, the stator may have an outer peripheral portion covered with a resin, and the resin may be disposed between an output-side end surface of the projection and the concave portion on the output-side flange.

The present motor may further include: a metal frame that covers an outer peripheral portion of the stator; and a sealing member disposed between an output-side end surface of the projection and the concave portion on the output-side flange.

In the present motor, the teeth iron core and the yoke iron core may each include a plurality of laminated electromagnetic steel plate sheets, and a count of the laminated electromagnetic steel plate sheets at the yoke iron core may be greater than a count of the laminated electromagnetic steel plate sheets at the teeth iron core.

In the present motor, the stator may include a first part and a second part, the first part including a plurality of laminated first electromagnetic steel plate sheets where a teeth portion is formed integrally with a yoke portion, the second part including a plurality of second electromagnetic steel plate sheets for the projection, the second electromagnetic steel plate sheets being laminated on the first part.

In the present motor, the stator may include a plurality of divided stators, and the divided stator may include a first part and a second part, the first part including a plurality of laminated first electromagnetic steel plate sheets where a teeth portion is formed integrally with a yoke portion, the second part including a plurality of second electromagnetic steel plate sheets for the projection, the second electromagnetic steel plate sheets being laminated on the first part.

The present motor allows an improvement in heat emission effect of the motor and conduction of grounding with a simpler configuration. Additional features regarding a technique of the present disclosure will be apparent from a description of this description and attached drawings. Configurations and effects other than the above-described one will be apparent from the following explanation of embodiments.

The following describes embodiments of the present disclosure with reference to the attached drawings. The attached drawings illustrate specific embodiments in accordance with principle of the technique of the present disclosure. These attached drawings are illustrated for understanding the present disclosure, and are never used for interpreting the technique of the present disclosure in a limited way.

The following embodiments relate to a structure of a motor that can reduce a temperature rise of the motor and easily perform a conduction of grounding. In the following embodiments, an end surface of a yoke iron core included in a stator projects with respect to an end surface of a teeth iron core on an output side (load side) of the motor. The following first describes a method for manufacturing the projection of the yoke iron core.

The yoke iron core may have the projection that projects with respect to the end surface of the teeth iron core on the output side of the motor. The yoke iron core may have a projection that projects with respect to the end surface of the teeth iron core across a whole circumference of an outer periphery of the yoke iron core on the output side of the motor.

Figure 1B:
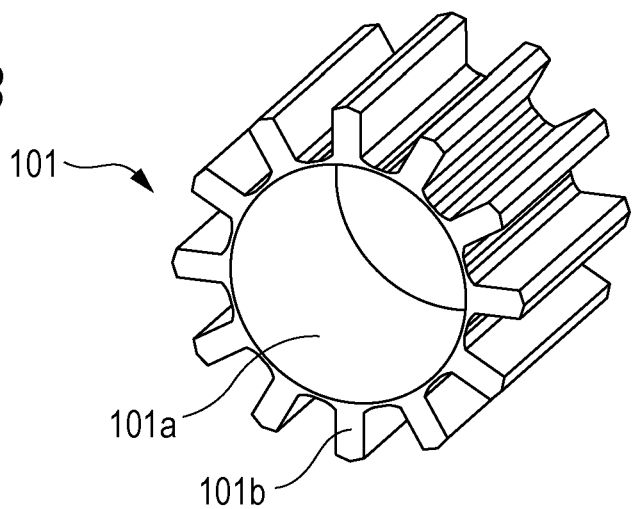
Figure 1C:
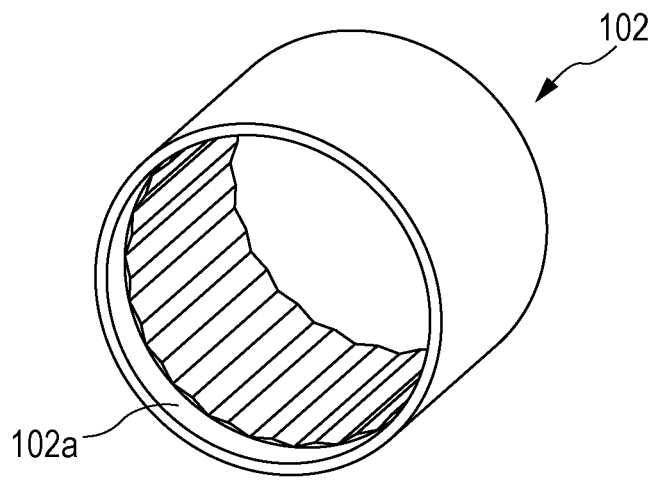

FIGS. 1A to 1C illustrate a stator 100 as a first configuration example of a stator. The stator 100 is a cylindrical member. The stator 100 includes a teeth iron core 101 and a yoke iron core 102. The teeth iron core 101 has a plurality of teeth 101b. The teeth 101b project radially outward from an outer periphery of a ring portion 101a of a core. A plurality of partitions is formed between the respective teeth 101b as a space to house a coil.

With the stator 100, the teeth iron core 101 and the yoke iron core 102 can be divided. FIG. 1B illustrates the teeth iron core 101 alone. FIG. 1C illustrates the yoke iron core 102 alone. The teeth iron core 101 and the yoke iron core 102 are each made of an electromagnetic steel plate. The electromagnetic steel plate includes a plurality of laminated electromagnetic steel plate sheets (thin plates). The teeth iron core 101 is formed by laminating a plurality of first electromagnetic steel plate sheets for the teeth iron core 101. The yoke iron core 102 is formed by laminating a plurality of second electromagnetic steel plate sheets for the yoke iron core 102. That is, the teeth iron core 101 and the yoke iron core 102 each include the plurality of laminated electromagnetic steel plate sheets.

The yoke iron core 102 has a projection 102a. The projection 102a projects to the output side with respect to the end surface of the teeth iron core 101 on the output side of the motor. In the examples of FIGS. 1A to 1C, the count of laminated second electromagnetic steel plate sheets for the yoke iron core 102 is larger than the count of laminated first electromagnetic steel plate sheets for the teeth iron core 101. This forms the projection 102a serving as the output-side end surface of the yoke iron core 102.

Figure 2A:
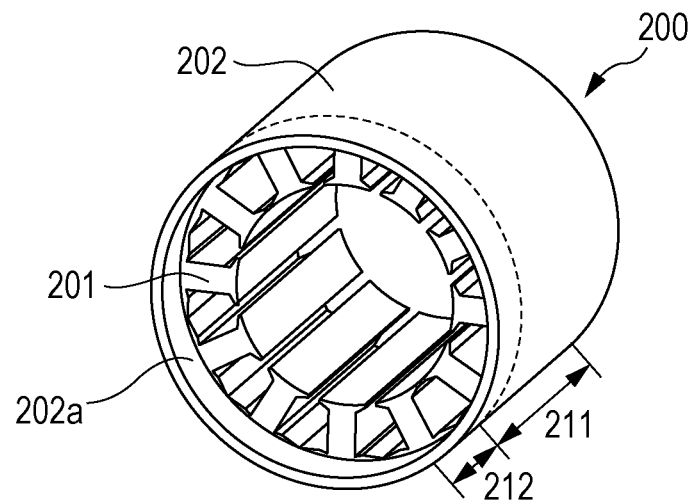
FIGS. 2A to 2C are a second configuration example of a stator according to an embodiment of the present disclosure.
Figure 2B:
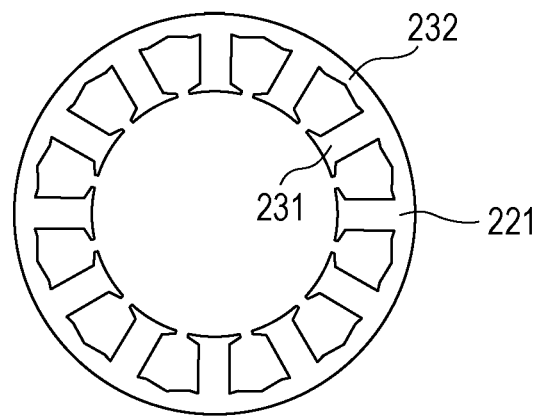
Figure 2C:
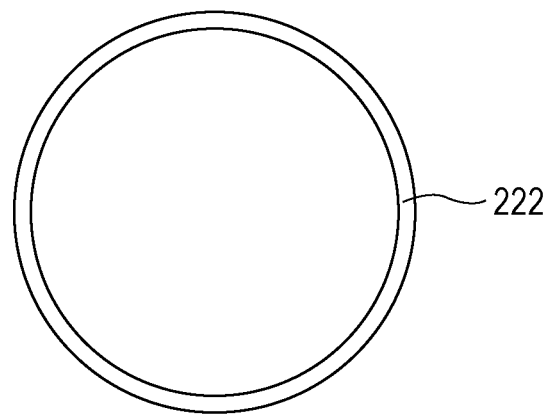

FIGS. 2A to 2C illustrate a stator 200 as a second configuration example of the stator. The stator 200 includes a teeth iron core 201 and a yoke iron core 202. The stator 200 includes a first part 211 and a second part 212. Here, the second part 212 corresponds to a projection 202a on the yoke iron core 202. The projection 202a projects with respect to an end surface of the teeth iron core 201 on the output side. FIG. 2B illustrates a first electromagnetic steel plate sheet 221 to form the first part 211. FIG. 2C illustrates a second electromagnetic steel plate sheet 222 to form the second part 212.

The first part 211 is formed by laminating the plurality of first electromagnetic steel plate sheets 221 where a teeth portion 231 is formed integrally with a yoke portion 232. Next, the second electromagnetic steel plate sheets 222 for the projection 202a are laminated on the laminated first electromagnetic steel plate sheets 221. This forms the projection 202a serving as the output-side end surface of the yoke iron core 202. That is, the stator 200 includes the first part 211, which includes the plurality of laminated first electromagnetic steel plate sheets 221 where the teeth portion 231 is formed integrally with the yoke portion 232, and the second part 212, which includes the plurality of laminated second electromagnetic steel plate sheets 222 for the projection 202a laminated on the first part 211.

Figure 3A:
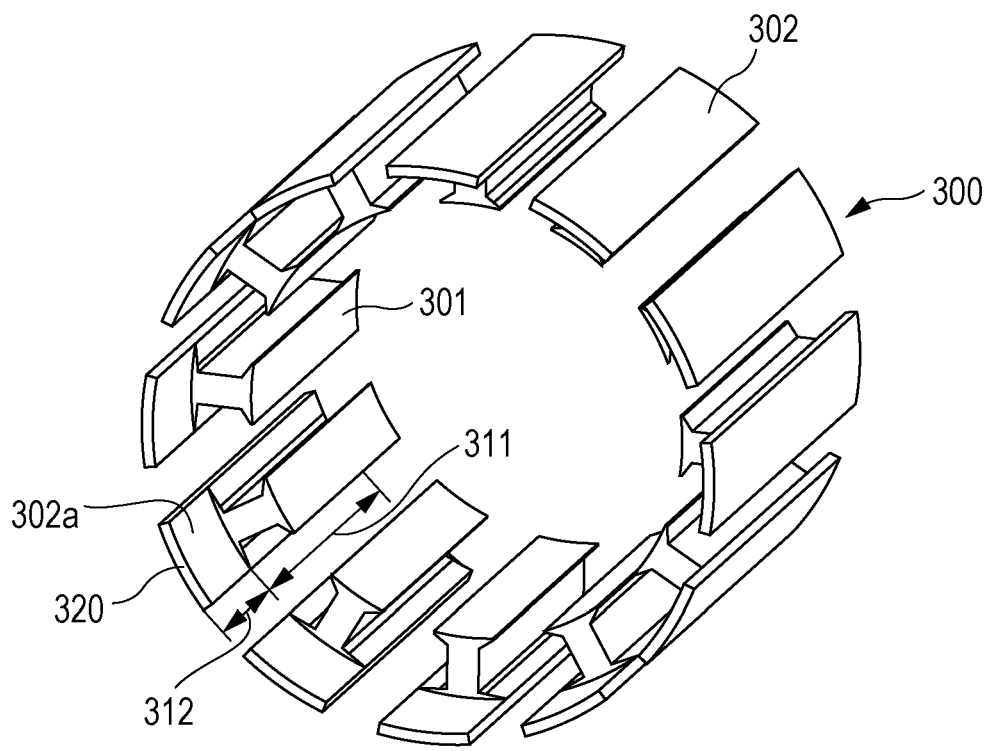
FIGS. 3A to 3C are a third configuration example of a stator according to an embodiment of the present disclosure.
Figure 3B:
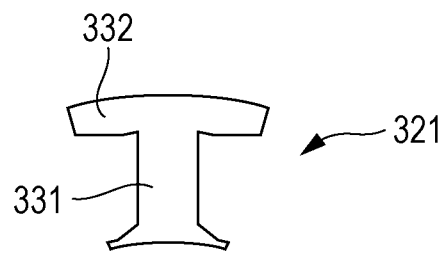
Figure 3C:

FIGS. 3A to 3C illustrate a stator 300 as a third configuration example of the stator. The stator 300 includes teeth iron cores 301 and yoke iron cores 302. In the stator 300, the teeth iron cores 301 and the yoke iron cores 302 are divided for each slot of the motor. The stator 300 is formed by combining a plurality of divided stators 320 made of the electromagnetic steel plate. That is, the stator 300 includes the plurality of divided stators 320. The divided stator 320 includes a first part 311 and a second part 312.

Here, the first part 311 includes a part of the divided portion of the teeth iron core 301 and a part of the divided portion of the yoke iron core 302. The second part 312 is included in a part of the divided portion of the projection 302a on the yoke iron core 302. The projection 302a projects with respect to an end surface of the teeth iron core 301 on the output-side. FIG. 3B illustrates a first electromagnetic steel plate sheet 321 to form the first part 311. FIG. 3C illustrates a second electromagnetic steel plate sheet 322 to form the second part 312.

The first part 311 is formed by laminating the first electromagnetic steel plate sheets 321 where a teeth portion 331 is formed integrally with a yoke portion 332. Next, the second electromagnetic steel plate sheets 322 that constitute a projection 302a are laminated on the laminated first electromagnetic steel plate sheets 321. This forms the one divided stator 320. That is, the divided stator 320 includes the first part 311, which includes the plurality of laminated first electromagnetic steel plate sheets 321 where the teeth portion 331 is formed integrally with the yoke portion 332, and the second part 312, which includes the plurality of second electromagnetic steel plate sheets 322 for the projection 302a laminated on the first part 311. After the divided stators 320 are formed, combining the plurality of divided stators 320 forms the stator 300.

The following describes a motor that applies the stator of any one of FIGS. 1A to 1C, FIGS. 2A to 2C, and FIGS. 3A to 3C. The motor is roughly classified into a mold motor and a frame motor. After a coil wire is wound around a teeth iron core, a stator of the mold motor is sealed by a resin. After a coil wire is wound around a teeth iron core, a stator of the frame motor is inserted into a metallic frame.

Figure 4:
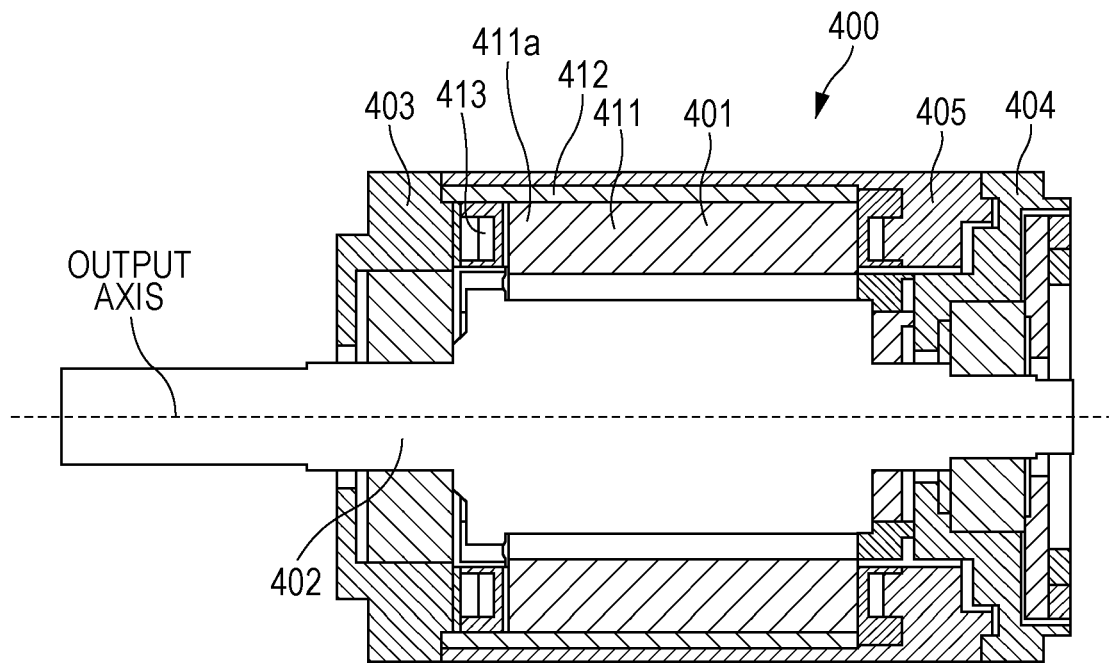
FIG. 4 is a cross-sectional view of a mold motor of the first configuration example according to the embodiment of the present disclosure.

FIG. 4 is a cross-sectional view of a mold motor of the first configuration example. A mold motor 400 includes a stator 401, a rotor 402, an output-side flange 403, and an opposite-output-side flange 404 as main components. The stator 401 internally houses the rotor 402. The output-side flange 403 is a flange disposed on a side of outputting a rotation force of the mold motor 400. The opposite-output-side flange 404 is a flange disposed on a side opposite to the output-side flange 403 of the mold motor 400. An outer peripheral portion of the stator 401 is sealed by a sealing resin 405. That is, the outer peripheral portion of the stator 401 is covered with the sealing resin 405.

The stator 401 includes a teeth iron core 411 and a yoke iron core 412. It is only necessary that the stator 401 has a configuration any one of FIGS. 1A to 1C, FIGS. 2A to 2C, and FIGS. 3A to 3C. A winding wire 413 of a coil is wound around a plurality of teeth 411a of the teeth iron core 411.

Figure 5:
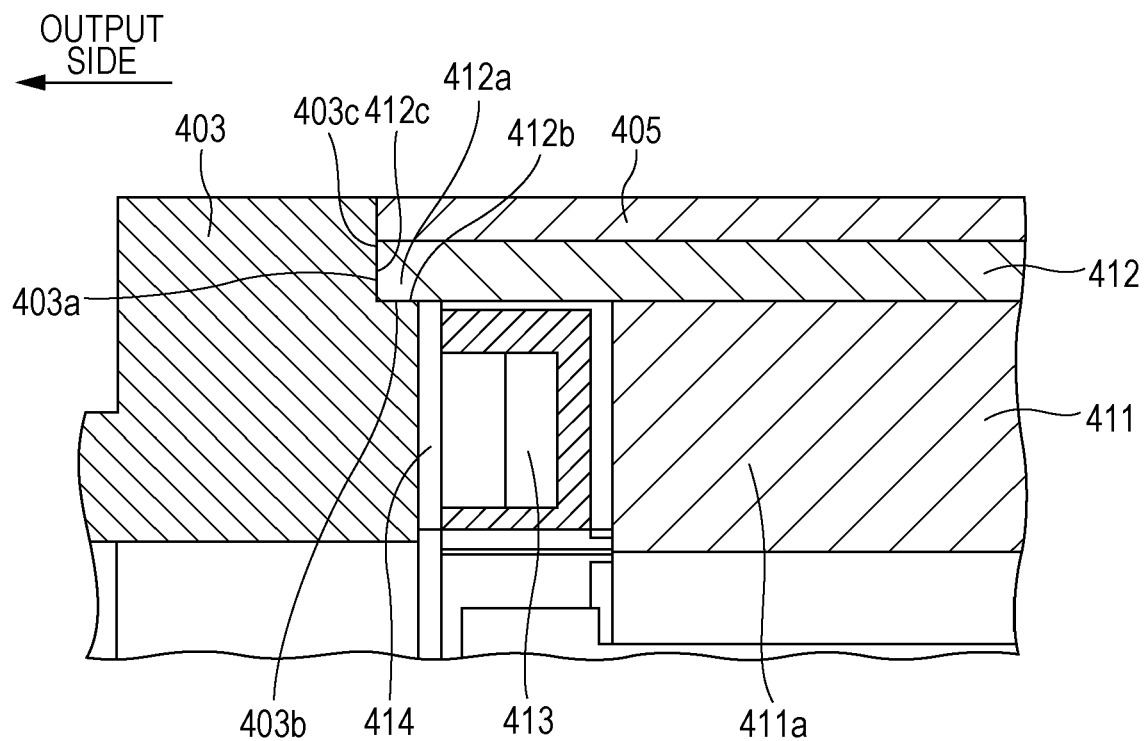
FIG. 5 is an enlarged cross-sectional view of the mold motor illustrated in FIG. 4.

FIG. 5 is an enlarged cross-sectional view of the mold motor in FIG. 4. The yoke iron core 412 has a projection 412a. The projection 412a, for example, corresponds to the above-described projection 102a, projection 202a, and projection 302a. The projection 412a projects with respect to an output-side end surface of the teeth iron core 411 on the output-side of the mold motor 400. The output-side flange 403 has a concave portion (spigot portion) 403a that receives the projection 412a on the yoke iron core 412 through fitting. The concave portion 403a has an L shape in cross section on FIG. 5 and includes a bottom surface 403b and a side surface 403c.

In this embodiment, an inner peripheral surface 412b of the projection 412a on the yoke iron core 412 contacts the bottom surface 403b of the concave portion 403a on the output-side flange 403. An output-side end surface 412c on the projection 412a of the yoke iron core 412 contacts the side surface 403c of the concave portion 403a on the output-side flange 403.

Figure 6:
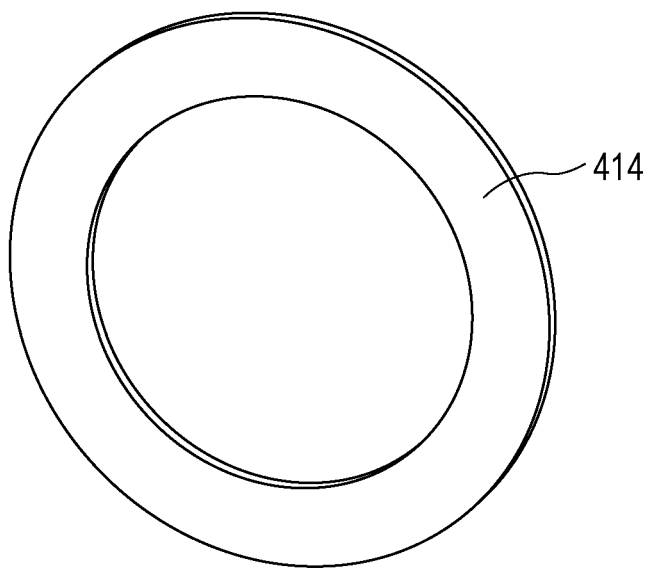
FIG. 6 is an exemplary perspective view of a heat transmission member according to the embodiment of the present disclosure.

In this embodiment, a heat transmission member 414 is disposed between the teeth iron core 411 and the output-side flange 403. FIG. 6 is a perspective view of the heat transmission member 414. As one example, the heat transmission member 414 is an annular member. The heat transmission member 414 is disposed at a clearance between the winding wire 413 of the coil and the output-side flange 403 so as to fill this clearance. Additionally, the heat transmission member 414 is inserted to improve heat dissipation by heat conduction from the winding wire 413 to the output-side flange 403. Specifically, as the heat transmission member 414, for example, an elastic heat transmission sheet containing high molecules such as a silicon or an acrylic is applicable. In this embodiment, the inner peripheral surface 412b of the projection 412a on the yoke iron core 412 also contacts the heat transmission member 414. A surface on the output side of the heat transmission member 414 directly contacts the output-side flange 403.

Figure 7A:
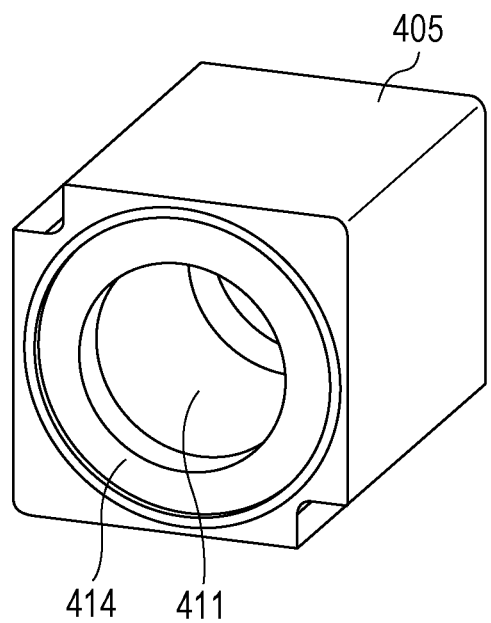
FIGS. 7A and 7B are perspective views illustrating a stator, a sealing resin, and the heat transmission member in FIG. 4.
Figure 7B:
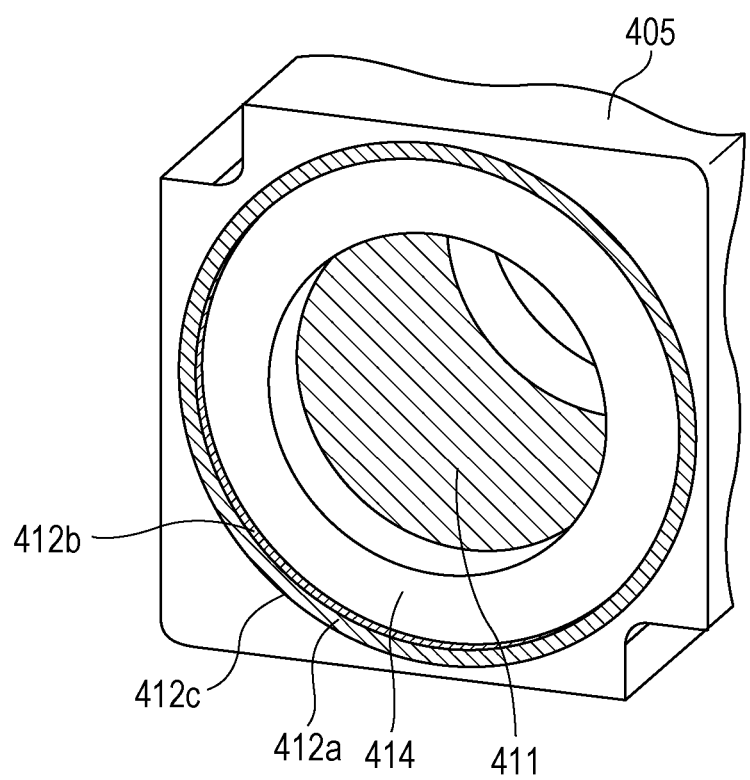

FIGS. 7A and 7B illustrate the stator 401, the sealing resin 405, and the heat transmission member 414 in FIG. 4. Diagonal lines in FIG. 7B show an exposed portion of the yoke iron core 412 and an exposed portion of the teeth iron core 411. As illustrated in FIG. 7B, the inner peripheral surface 412b and the output-side end surface 412c of the projection 412a are not covered with the sealing resin 405 and metal parts of the inner peripheral surface 412b and the output-side end surface 412c are bared. In the stator 401 of this embodiment, the inner peripheral surface 412b and the output-side end surface 412c of the projection 412a on the yoke iron core 412 are fitted to the concave portion 403a on the output-side flange 403. Especially, the inner peripheral surface 412b of the projection 412a directly contacts the output-side flange 403. This allows the heat from being released from the inner peripheral surface 412b of the projection 412a to the output-side flange 403.

As described above, the yoke iron core includes the electromagnetic steel plate as the laminated body of the electromagnetic steel plate sheet. Accordingly, the heat is less likely to flow in the laminating direction of the yoke iron core (here, an output axis direction of the motor). In contrast to this, with this embodiment, the heat generated at the teeth iron core 411, the yoke iron core 412, and the coil transmits to the output-side flange 403 via the inner peripheral surface 412b of the projection 412a. This improves the heat emission effect at the motor.

In this embodiment, the heat transmission member 414 is disposed between the end surface of the winding wire 413 of the coil and the output-side flange 403. This ensures securing a larger heat transmission area. Consequently, an effect to reduce a temperature of the motor is achieved. The inner peripheral surface 412b of the projection 412a on the yoke iron core 412 contacts the heat transmission member 414. Furthermore, the surface on the output side of the heat transmission member 414 contacts the output-side flange 403. Accordingly, the heat transmission member 414 also allows the heat from the inner peripheral surface 412b of the projection 412a to be released to the output-side flange 403.

Figure 13:
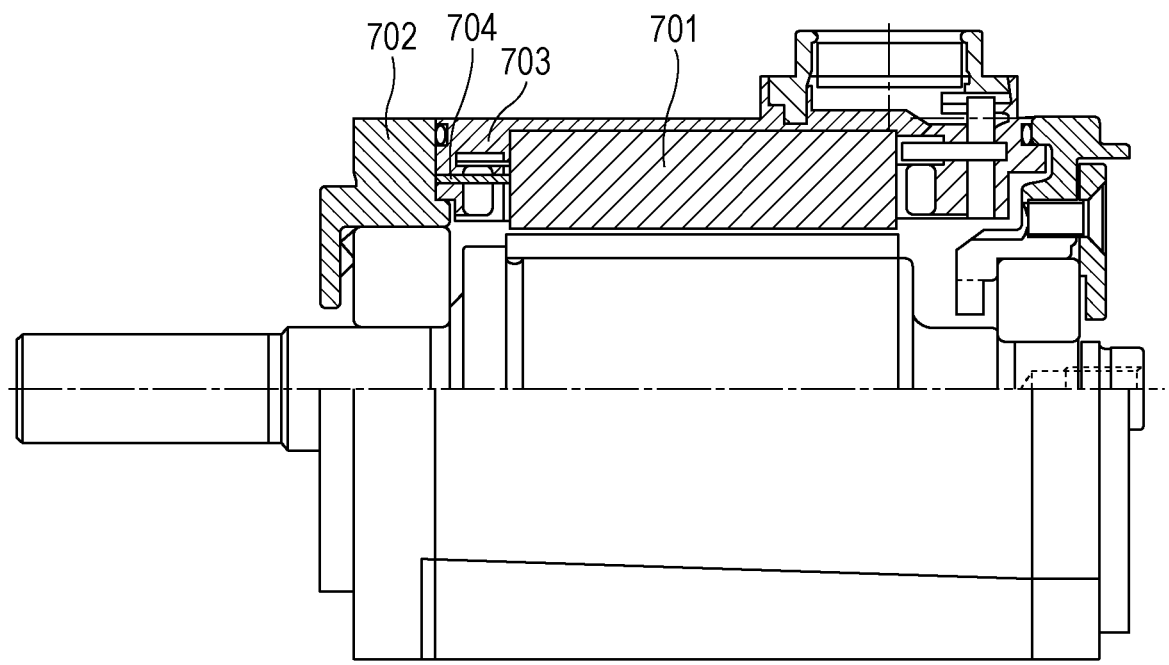
FIG. 13 is a cross-sectional view of a typical mold motor.

FIG. 13 illustrates a configuration of a typical mold motor as a comparative example. In the example of FIG. 13, a sealing resin 703 gets into between a stator 701 and an output-side flange 702. Similar to the technique of Japanese Patent No. 3780164, in the mold motor in FIG. 13, a plurality of metal bars 704 are inserted between the stator 701 and the output-side flange 702 for heat emission and grounding. These metal bars 704 couple the stator 701 to the output-side flange 702. Thus, typically, for the heat emission, grounding conduction, and the like, the metal bars 704 were needed to be prepared.

In contrast to this, this embodiment eliminates the need for preparing such metal bars. In this embodiment, the inner peripheral surface (the exposed portion of the iron core) 412b of the projection 412a directly contacts the output-side flange 403. Therefore, this contact part emits the heat.

Furthermore, this contact part ensures securing a grounding conduction path. The laminated surface of the stator iron core is covered with an insulated film. However, at a sheared surface of the stator iron core, a metal part is bared and exposed. The use of this exposed portion of the stator iron core eliminates the need for interposing another member for heat emission and grounding conduction. Accordingly, this embodiment can provide a structure of the motor that allows an improvement in the heat emission effect of the motor and conduction of grounding with a simpler configuration.

Figure 8:
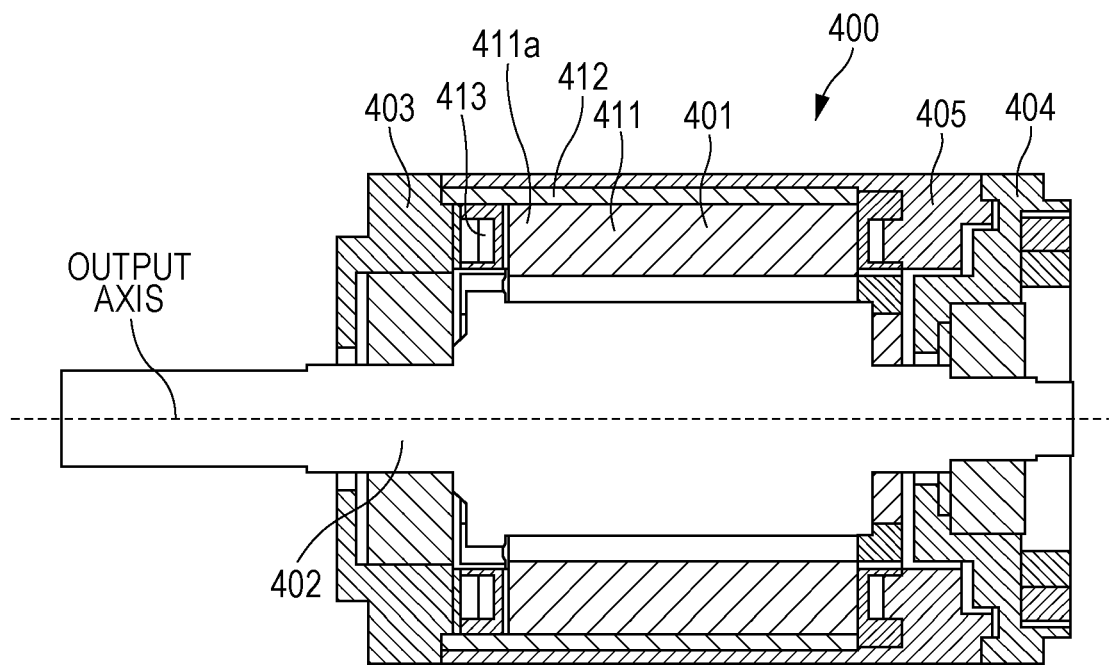
FIG. 8 is a cross-sectional view of the second configuration example of a mold motor according to the embodiment of the present disclosure.
Figure 9:
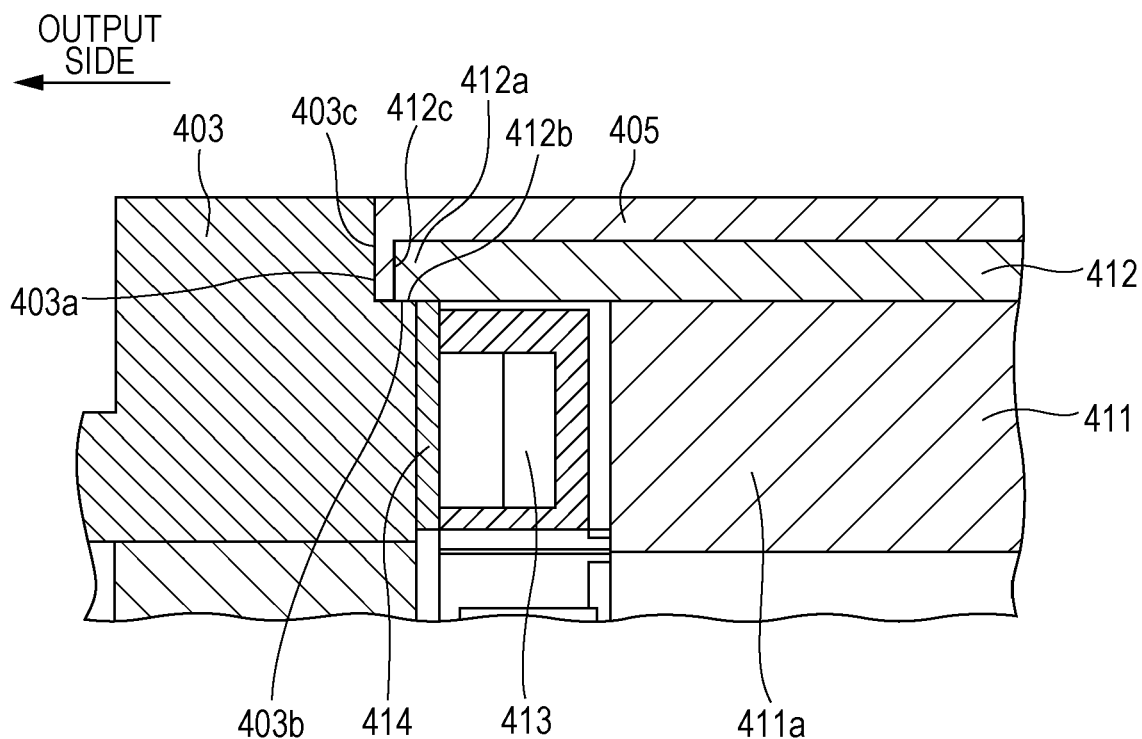
FIG. 9 is an enlarged cross-sectional view of the mold motor in FIG. 8.

FIG. 8 is a cross-sectional view of the second configuration example of the mold motor. FIG. 9 is an enlarged cross-sectional view of the mold motor in FIG. 8. Like reference numerals designate corresponding or identical elements to the above-described embodiment, and therefore such elements will not be further elaborated here.

In this embodiment, the sealing resin 405 gets into between the output-side end surface 412c of the projection 412a on the yoke iron core 412 and the side surface 403c of the concave portion 403a on the output-side flange 403. This ensures further enhancing the effect of sealing by the resin.

Figure 10A:
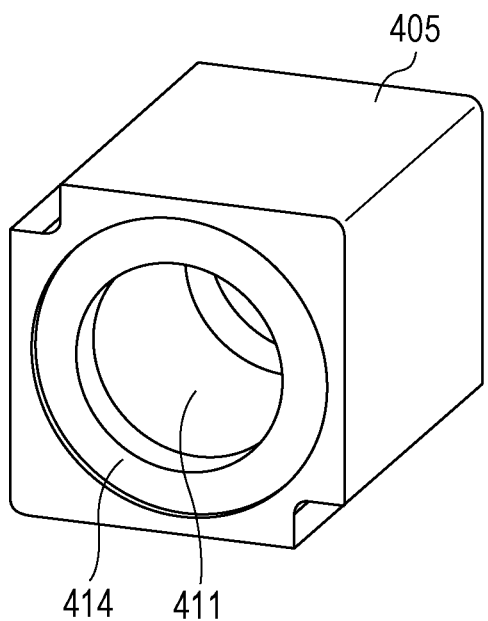
FIGS. 10A and 10B are perspective views illustrating a stator, a sealing resin, and a heat transmission member in FIG. 8.
Figure 10B:
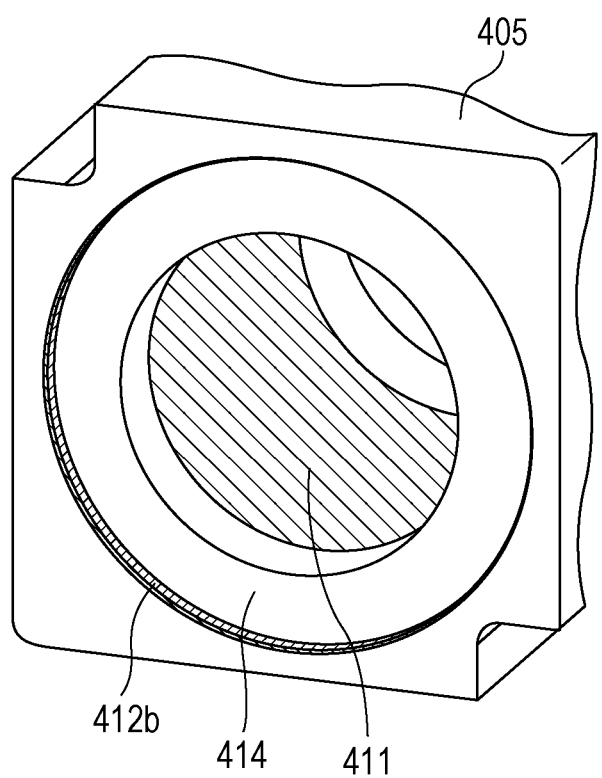

FIGS. 10A and 10B illustrate the stator 401, the sealing resin 405, and the heat transmission member 414 in FIG. 8. Diagonal lines in FIG. 10B show an exposed portion of the yoke iron core 412 and an exposed portion of the teeth iron core 411. In this example as well, the inner peripheral surface 412b of the projection 412a is not covered with the sealing resin 405 and a metal part of the inner peripheral surface 412b is bared. In the stator 401 of this embodiment, the inner peripheral surface 412b of the projection 412a on the yoke iron core 412 is fitted to the concave portion 403a on the output-side flange 403. With this embodiment, the heat generated at the teeth iron core 411, the yoke iron core 412, and the coil transmits to the output-side flange 403 via the inner peripheral surface 412b of the projection 412a. This improves the heat emission effect at the motor.

In this embodiment as well, the heat transmission member 414 is disposed between the end surface of the winding wire 413 of the coil and the output-side flange 403. This ensures securing a larger heat transmission area. Consequently, an effect to reduce a temperature of the motor is achieved. The inner peripheral surface 412b of the projection 412a on the yoke iron core 412 contacts the heat transmission member 414. Furthermore, the surface on the output side of the heat transmission member 414 contacts the output-side flange 403. Accordingly, the heat transmission member 414 also allows the heat from the inner peripheral surface 412b of the projection 412a to be released to the output-side flange 403.

In this embodiment as well, the inner peripheral surface 412b of the projection 412a directly contacts the output-side flange 403. Accordingly, this contact part ensures securing a grounding conduction path. This eliminates the need for interposing another member to secure grounding conduction.

Figure 11:
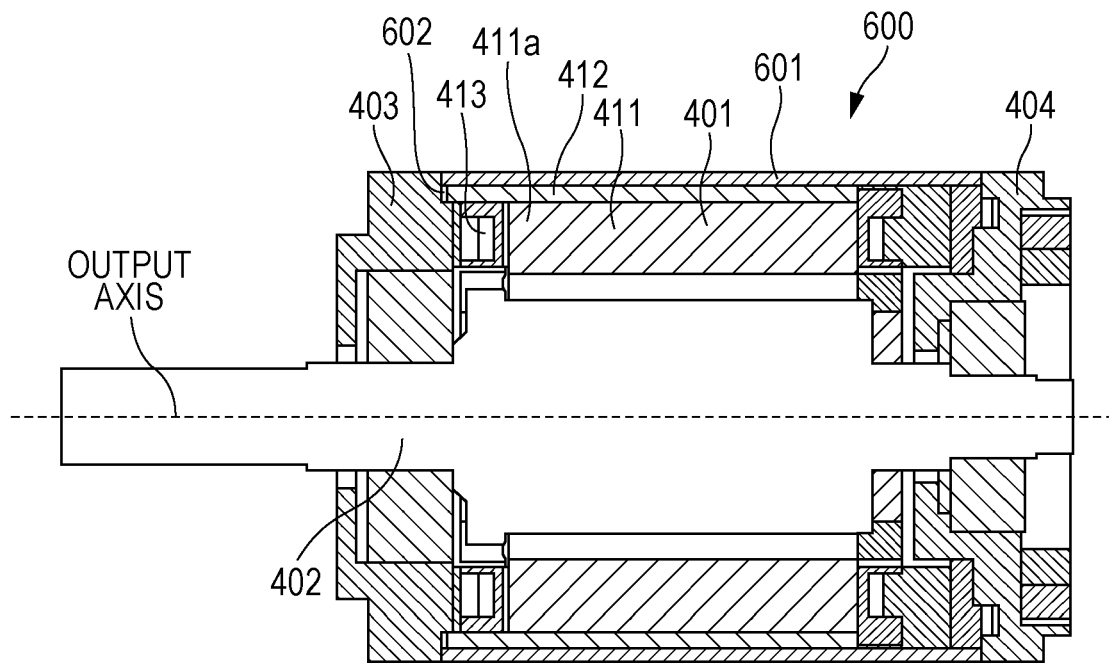
FIG. 11 is a cross-sectional view of a frame motor of the first configuration example according to the embodiment of the present disclosure.

FIG. 11 is a cross-sectional view of a frame motor of the first configuration example. Like reference numerals designate corresponding or identical elements to the above-described embodiment, and therefore such elements will not be further elaborated here. With a frame motor 600, a coil wire is wound around the teeth 411a of the teeth iron core 411 of the stator 401. Afterwards, the stator 401 is inserted into a metal frame 601. Accordingly, the metal frame 601 covers the outer peripheral portion of the stator 401.

In this embodiment as well, the metal part of the inner peripheral surface 412b of the projection 412a on the yoke iron core 412 is bared. The inner peripheral surface 412b of the projection 412a on the yoke iron core 412 contacts the bottom surface 403b of the concave portion 403a on the output-side flange 403. Accordingly, the heat generated at the teeth iron core 411, the yoke iron core 412, and the coil transmits to the output-side flange 403 via the inner peripheral surface 412b of the projection 412a. This improves the heat emission effect at the motor.

Figure 12:
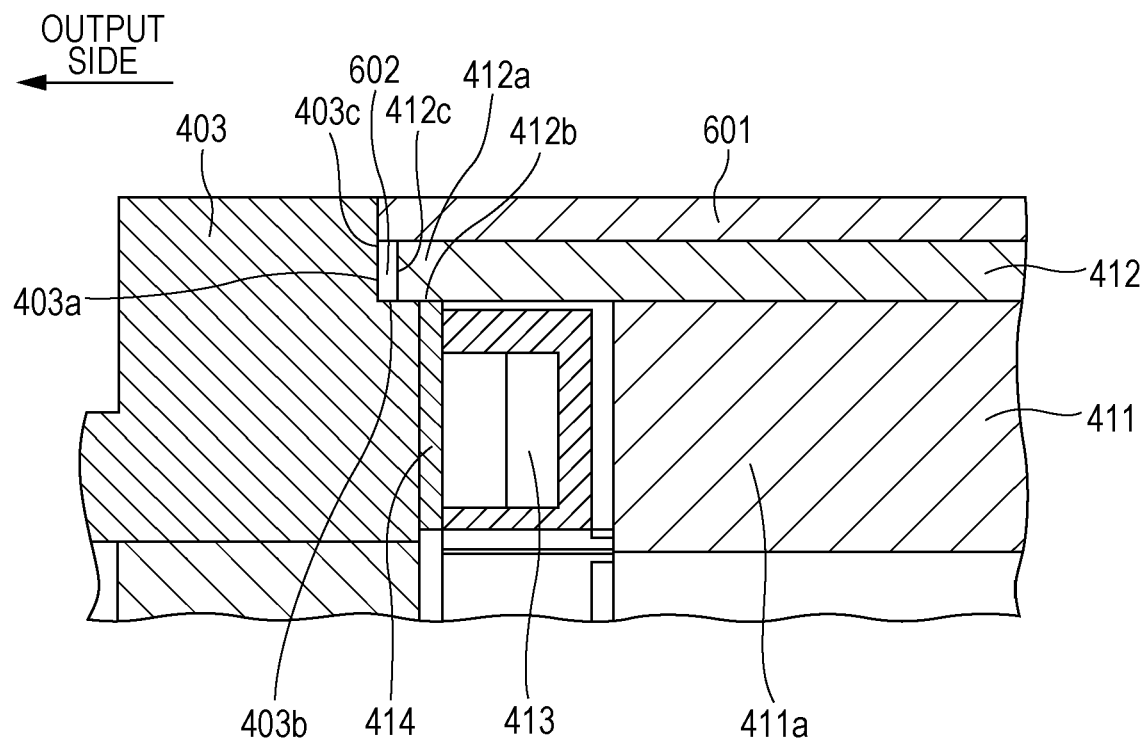
FIG. 12 is an enlarged cross-sectional view of a mold motor illustrated in FIG. 11.

FIG. 12 is an enlarged cross-sectional view of the frame motor in FIG. 11. In this embodiment, a sealing member 602 is disposed between the output-side end surface 412c of the projection 412a on the yoke iron core 412 and the side surface 403c of the concave portion 403a on the output-side flange 403. That is, this motor includes the sealing member 602 disposed between the output-side end surface 412c of the projection 412a and the concave portion 403a on the output-side flange 403. The sealing member 602 is disposed such that a longitudinal direction of the sealing member 602 becomes perpendicular to or approximately perpendicular to the output axis direction of the motor.

Figure 14:
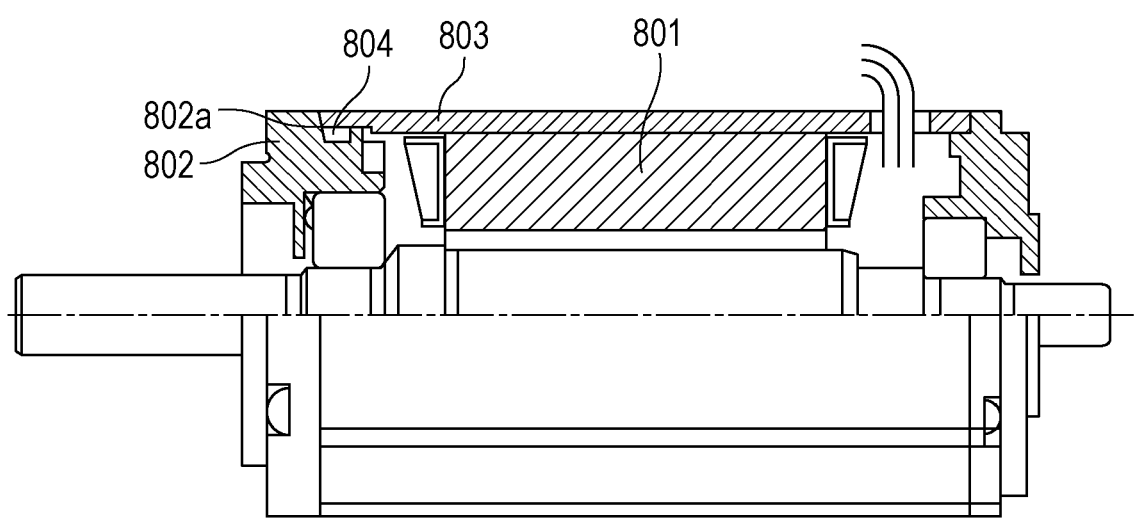
FIG. 14 is a cross-sectional view of a typical frame motor.

FIG. 14 illustrates a configuration of a typical frame motor as a comparative example. In the example of FIG. 14, a metal frame 803 covers an outer peripheral portion of a stator 801. A concave portion 802a for the metal frame 803 is formed at a flange 802. A sealing member 804 is disposed at the concave portion 802a of the flange 802. Thus, in the known art, only the metal frame 803 contacts the flange 802. This results in the small heat emission effect at the motor. Typically, the concave portion 802a is formed during a casting of the flange 802. Afterwards, to dispose the sealing member 804, machining accuracy of the concave portion 802a was needed to be enhanced. Since the space to provide the sealing member 804 is produced at the flange 802, this also increases a manufacturing difficulty. Additionally, the longitudinal direction of the sealing member 804 is parallel to the output axis direction of the motor. This increases a size of the motor in the output axis direction of the motor. Accordingly, a downsizing of the motor is inhibited.

In contrast to this, in this embodiment, the inner peripheral surface 412b of the projection 412a on the yoke iron core 412 directly contacts the output-side flange 403. In view of this, the heat generated at the teeth iron core 411, the yoke iron core 412, and the coil transmits to the output-side flange 403 via the inner peripheral surface 412b of the projection 412a. This improves the heat emission effect at the motor. The sealing member 602 is disposed at the clearance between the output-side end surface 412c of the projection 412a on the yoke iron core 412 and the side surface 403c of the concave portion 403a on the output-side flange 403. This configuration interposes the sealing member 602 between the projection 412a and the concave portion 403a. This eliminates the need for disposing the highly-accurately-machined concave portion for insertion of the sealing member 602 at the flange or the frame. This makes it possible to facilitate the production of the motors. The longitudinal direction of the sealing member 602 is in the direction perpendicular to or approximately perpendicular to the output axis direction of the motor. This ensures shortening an overall length of the motor in the output axis direction, ensuring downsizing the motor.

In the above-described embodiments, the yoke iron core 412 of the stator 401 is extended to the output-side flange 403 side. The inner peripheral part of the yoke iron core 412 is fitted to the concave portion 403a on the output-side flange 403. That is, the motor includes the projection 412a provided with the yoke iron core 412 and projects with respect to the end surface of the teeth iron core 411 on the output side of the motor. Furthermore, the motor includes the concave portion 403a provided with the output-side flange 403 and having the projection 412a. This concave portion 403a contacts the inner peripheral surface 412b of the projection 412a. This ensures the improvement in heat dissipation performance of the motor and the conduction of grounding.

The example where the stator is inserted into the metal frame (see FIGS. 11 and 12) also provides the effects identical to the above-described effects. Additionally, the sealing member 602 is disposed between the output-side end surface 412c of the projection 412a on the yoke iron core 412 and the side surface 403c of the concave portion 403a on the output-side flange 403. This ensures eliminating the seal structure (concave portion) disposed at the typical flange. Moreover, since this allows shortening the overall length of the motor, thereby ensuring downsizing the motor.

The technique of the present disclosure is not limited to the above-described embodiments, and includes various modifications. The above-described embodiments are described in detail in order to describe comprehensibly the technique of this disclosure. The technique of this disclosure is not necessarily limited to the configuration including all the described configurations. A part of the configuration of one embodiment can be replaced to the configuration of other embodiment. To the configuration of one embodiment, the configuration of other embodiment can be applied. To the respective embodiments, other configuration can be applied. Furthermore, a part of the respective embodiments can be removed or changed to other configuration.

Note that, the stator 401 may be constituted in a form such that the inner peripheral surface 412b (and the output-side end surface 412c) of the projection 412a on the yoke iron core 412 is fitted to the concave portion 403a on the output-side flange 403. The mold motor 400 may employ a form that extends only the yoke iron core 412 of the stator 401 to the output-side flange 403 side to fit the inner peripheral part of the yoke iron core 412 to the concave portion 403a of the output-side flange 403.

The embodiments of the present disclosure may be the following first to tenth motors.

The first motor is a motor that includes a stator, a rotor, and an output-side flange. The stator includes a teeth iron core and a yoke iron core. The rotor is housed in the stator. The yoke iron core has a projection that projects with respect to an end surface of the teeth iron core on an output side of the motor. The output-side flange has a concave portion at which the projection is disposed. An inner peripheral surface of the projection contacts the concave portion on the output-side flange.

In the second motor according to the first motor, the motor includes a heat transmission member between the teeth iron core and the output-side flange.

In the third motor according to the second motor, the inner peripheral surface of the projection contacts the heat transmission member.

In the fourth motor according to any one of the first to the third motors, the stator has an outer peripheral portion covered with a resin. The projection has an output-side end surface that contacts the concave portion on the output-side flange.

In the fifth motor according to any one of the first to the third motors, the stator has an outer peripheral portion covered with a resin. The resin is disposed between an output-side end surface of the projection and the concave portion on the output-side flange.

In the sixth motor according to any one of the first to the third motors, an outer peripheral portion of the stator is covered with a metal frame. A sealing member is disposed between an output-side end surface of the projection and the concave portion on the output-side flange.

In the seventh motor according to any one of the first to the sixth motors, the teeth iron core and the yoke iron core are each formed of electromagnetic steel plates. A count of laminated electromagnetic steel plate sheets at the yoke iron core is larger than a count of laminated electromagnetic steel plate sheets at the teeth iron core.

In the eighth motor according to any one of the first to the sixth motors, the stator is formed of an electromagnetic steel plate. The stator is constituted of a first part and a second part. The first part is formed of laminated first electromagnetic steel plate sheets where a teeth portion is formed integrally with a yoke portion. The second part is formed of laminated second electromagnetic steel plate sheets for the projection on the first part.

In the ninth motor according to any one of the first to the sixth motors, the stator is constituted of a plurality of divided stators formed of electromagnetic steel plates. The divided stators are constituted of first parts and second parts. The first parts are formed of laminated first electromagnetic steel plate sheets where teeth portions are formed integrally with yoke portions. The second parts are formed of laminated second electromagnetic steel plate sheets for the projections on the first parts.

The tenth motor is a motor that includes a stator, a rotor, and an output-side flange. The stator includes a teeth iron core and a yoke iron core. The rotor is housed in the stator. The yoke iron core has a projection that projects with respect to an end surface of the teeth iron core across a whole circumference of an outer periphery of the yoke iron core on an output side of the motor. The output-side flange has a concave portion at which the projection is disposed. An inner peripheral surface of the projection contacts the concave portion on the output-side flange.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor comprising:
a stator that includes a teeth iron core and a yoke iron core, the stator having an outer peripheral portion covered with a covering member;
a rotor housed in the stator;
an output-side flange; and
a heat transmission member disposed between the teeth iron core and the output-side flange,
wherein the yoke iron core comprises a projection projecting on an output side of the motor along a rotational axis of the rotor with respect to an end surface of the teeth iron core;
wherein the output-side flange comprises a concave portion at which the projection is disposed, the concave portion contacting an inner peripheral surface of the projection;
wherein a surface of the heat transmission member is in direct contact with a surface of the output-side flange;

wherein the projection projects along the rotational axis of the rotor with respect to an output surface of the heat transmission member; and wherein the inner peripheral surface of the projection is in direct contact with both the heat transmission member and the concave portion of the output-side flange.

2. The motor according to claim 1, wherein
the covering member is a resin, and
the projection has an output-side end surface that contacts the concave portion on the output-side flange.

3. The motor according to claim 1, wherein
the covering member is a resin, and
the covering member is disposed between an output-side end surface of the projection and the concave portion on the output-side flange.

4. The motor according to claim 1, wherein the covering member is a metal frame, and
a sealing member is disposed between an output-side end surface of the projection and the concave portion on the output-side flange.

5. The motor according to claim 1, wherein
the teeth iron core and the yoke iron core each include a plurality of laminated electromagnetic steel plate sheets, and
a count of the laminated electromagnetic steel plate sheets at the yoke iron core is greater than a count of the laminated electromagnetic steel plate sheets at the teeth iron core.

6. The motor according to claim 1, wherein
the stator includes a first part and a second part, the first part including a plurality of laminated first electromagnetic steel plate sheets where a teeth portion is formed integrally with a yoke portion, the second part including a plurality of second electromagnetic steel plate sheets for the projection, the second electromagnetic steel plate sheets being laminated on the first part.

7. The motor according to claim 1, wherein
the stator includes a plurality of divided stators, and
the divided stator includes a first part and a second part, the first part including a plurality of laminated first electromagnetic steel plate sheets where a teeth portion is formed integrally with a yoke portion, the second part including a plurality of second electromagnetic steel plate sheets for the projection, the second electromagnetic steel plate sheets being laminated on the first part.

8. The motor according to claim 1, further comprising an opposite-output-side flange disposed on a side opposite to the output-side flange in a direction of the rotational axis,
wherein the covering member is interposed between the opposite-output-side flange and an opposite-output-side end of the yoke iron core disposed at a side opposite to the projection in the direction of the rotational axis.

* * * * *